Patented Apr. 8, 1952

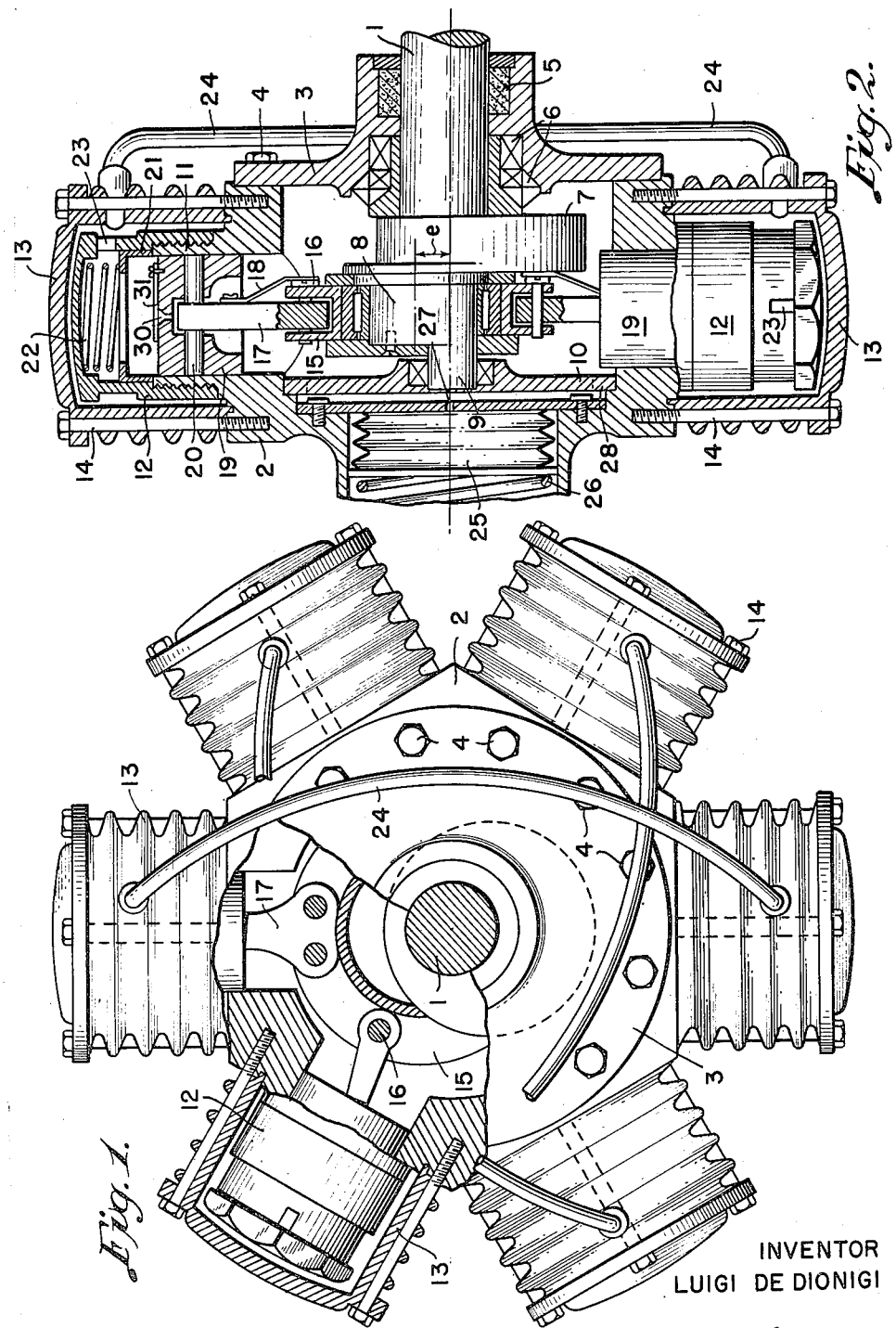

2,592,015

UNITED STATES PATENT OFFICE 2,592,015

AUTOMATIC HYDRAULIC SPEED CHANGE MECHANISM

Luigi De Dionigi, Rome, Italy

Application December 11, 1948, Serial No. 64,878
In Italy December 15, 1947

2 Claims. (Cl. 192—60)

This invention relates to a speed changing device for automatically varying the angular velocity of the driving shaft of an internal combustion engine in accordance with the load.

In the case of a motor vehicle beginning an assent, the resistance on the driving shaft is increased and the engine slowed down. Without some means for increasing the speed of the engine, the vehicle will stop. Two solutions of the problem have been proposed, in one a number of gear changes are used in order that with any grade it is possible to establish a reasonable balance between the rotative moment of the wheels and the moment of resistance. In the other solution, automatic means are provided for the insertion of different speed ratios but just when there is a lack of equilibrium between the moment of resistance and the rotative moment of the wheels.

It is an object of the instant invention to automatically maintain the driving shaft of an internal combustion engine in equilibrium with the moment of resistance.

A further object is to increase the efficiency of internal combustion engines.

Other objects of the instant invention will become apparent in the course of the following specification.

In the accomplishment of the objectives, the device connects the driving and driven shafts of the engine. In the device are reciprocally mounted a series of correlated pistons acting upon any known fluid. Through suitably positioned openings, the pistons pump the fluid freely in the idling position of the engine but with increased angular velocity, the passage of the fluid through the openings will be retarded causing the device to rotate and with it the driven shaft with which it is connected. With the openings completely blocked, a divert drive between the driving shaft and the driven shaft is established.

The invention will appear more clearly when taken in connection with the accompanying drawings showing by way of example a preferred embodiment of the inventive idea.

In the drawings:

Figure 1 is a front elevational view of the speed changing device constructed in accordance with the principles of this invention with part of the surface broken away the more clearly to show the internal construction; and Figure 2 is a sectional view of the device shown in Figure 1.

Referring now in greater detail to the drawings where like reference numerals indicate like parts, reference numeral 1 indicates the engine or driving shaft which under some conditions will revolve a hollow hexagonal block 2 enclosed on one end by a cover 3 fixed to the block by the screws 4.

The end of the driving shaft 1 is rotatably passed through the center of the cover 3. A stuffing box 5 is inserted around the shaft on the outside of the cover to prevent leakage of the fluid as later described while radial and thrust bearings 6 provide an antifriction support for the shaft on the inside of the cover. A counterpoise 7 is attached to the shaft 1 within the block to balance a cam 8 having an eccentricity "e" with respect to the center line of the shaft 1 and is attached by any suitable means to the shaft and adjacent the inner surface of the counterpoise. The cam on the opposite side is provided with a pin 9 which is aligned with the shaft 1 and is rotatably supported by a bearing held by a diaphragm 10 centered in the block 2.

On each face of the block 2 is a radially directed cylinder 11 provided with an external thread over which is attached a cylinder head 12 sheathed in a finned cover 13. The cover is fixed to the body of the block 2 by the studs 14 and nuts which press on the cover 13. A gasket may be used between the bottom of the cover and the block to provide a seal.

Coacting with the cam 8 is a U-shaped ring 15 in the upper rims of which are aligned holes for the insertion of the key bolts 16 which also pass through the ends of each connecting rod 17. One of the six connecting rods is fixed to the ring 15 by two key bolts so that the ring is maintained in the position shown in Figure 1. A spring 18 fixed to the shank of each connecting rod maintains the bolts in place. The opposite end of each connecting rod 17 is fixed to a piston 19 by another key bolt 20.

Inside of each cylinder head 12 is a ring 21 pressed against the rim of the cylinder 11 by a spring 22 and having a central opening.

The cavity of the device is filled with a known fluid and as a replenishment reservoir for the fluid, a small elastic bag 25 is connected to the cavity by an opening 27 and another opening 28 in the diaphragm 10. In each piston 19 is an axial opening 30, normally closed by a laminated spring 31 which, working as a valve, prevents the passage of the liquid from the top to the bottom of the piston but not in the opposite direction.

The operation of the speed changing device is as follows:

Suppose that the device is connected to the drive shaft of a motor vehicle on one side and to the driven shaft on the opposite side in the previously described manner. The drive shaft will put the cam in motion which causes the reciprocating motion of the pistons which pump the liquid. On the compression stroke of each piston the liquid will be discharged from the openings 23 in the head 12 and will fill the space between the head and the cover 13. However, since this space, as is all the other cavities of the device, is already filled with liquid the excess will discharge through the pipes 24 to flow to the opposed cylinder which will be in the expansion or suction stroke. When the drive shaft is running at a moderate R. P. M., the block will not be put in motion since the pumped liquid will be discharged readily through the openings 23. However, as the angular velocity of the drive shaft is increased the quantity of liquid discharged through the openings will be increased proportionally until the resistance to the passage of the liquid will reach a point where the block will rotate and start the vehicle. In addition, as the R. P. M. of the device is increased, each ring 21, due to centrifugal force, overcomes the resistance of the springs 22 and moves outwardly to limit the cross sectional area of the openings 23. As the openings are closed, the resistance of the pistons becomes greater until there is established an equalization between the moment of the resistance of the driven shaft and the drive shaft, which when the openings 23 are completely closed, the engine is in direct connection with the driven shaft. With suitable calibration of the springs, it is possible to get from the engine a higher degree of efficiency than heretofore possible. It is also to be noted that with this device it is possible to vary the power curve of an internal combustion engine by varying the tension of the springs 22 and the size of the openings 23.

Having thus described the invention what is claimed as new and desired to secure by Letters Patent, is:

1. A speed changing device in combination with the drive and driven shafts of an internal combustion engine, the device comprising a hollow block with open ends, the block having a cross section in the form of a polygon with an equal number of faces, a radially directed cylinder for each face of the block, a cylinder head for each cylinder, a finned cover for each cylinder and cylinder head and spaced therefrom; a cover disposed over one open end of the block, the cover having an opening in the center and adapted for the rotatable insertion of the drive shaft, a bearing for the shaft on the inside of the cover and a stuffing box disposed around the shaft on the outside of the cover, a diaphragm disposed over the opposite open end of the block, a bearing in the diaphragm and adapted for the rotatable support of the end of the drive shaft, a cam disposed on the drive shaft intermediate the two bearings, a U-shaped ring coacting with the cam; a piston for each cylinder, a connecting rod for each piston, at least one king bolt connecting the free end of each connecting rod between the rims of the U-shaped ring; a second ring superposed on the rim of the cylinder in the cylinder head, said second ring having an opening through the center, a spring disposed between the cylinder head and the second ring and adapted to maintain said ring under tension against the rim of the cylinder, the piston having an axial opening formed therethrough, means maintaining the axial opening closed under inwardly directed tension, the cylinder head having an outlet in the side and above the second ring in normal position, the finned jacket also having an opening formed therein coacting with the opening in the cylinder head, a conduit disposed between corresponding openings in opposed jackets, a fluid for the cavities of the block and the conduits, means automatically replenishing the fluid supply, and means connecting the block to the driven shaft and adapted to impart rotary motion thereto.

2. An automatic speed changing device in combination with the drive and driven shafts of an internal combustion engine according to claim 1 in which the means automatically replenishing the fluid supply comprises an elastic bag for the fluid, the bag having one open end, a cover for the open end, means securing the cover to the block in spaced relationship with the diaphragm, a spring disposed against the opposite end of the bag under tensiion, the cover having an opening therein and the diaphragm a coacting opening leading into the interior of the block.

LUIGI DE DIONIGI.

REFERENCES CITED

The following references are of record in the file of this patent:

UNITED STATES PATENTS

| Number | Name | Date |
|---|---|---|
| 1,274,461 | Shepard | Aug. 6, 1918 |
| 2,162,315 | Pittman | June 13, 1939 |

FOREIGN PATENTS

| Number | Country | Date |
|---|---|---|
| 76,193 | Sweden | 1933 |
| 112,536 | Great Britain | 1918 |
| 415,572 | Great Britain | 1934 |